May 28, 1940.  M. SCHILDE  2,202,603
VEHICLE SPRING
Filed April 6, 1939
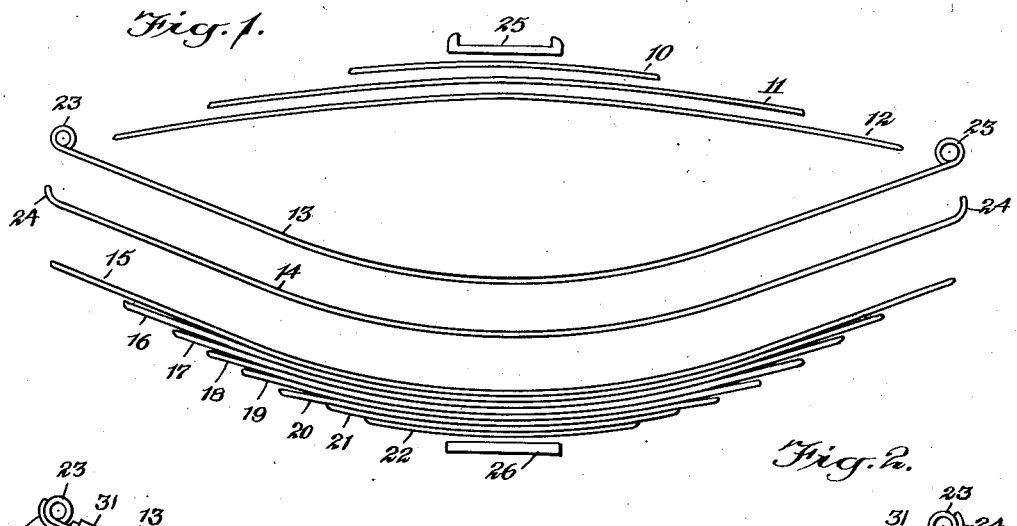
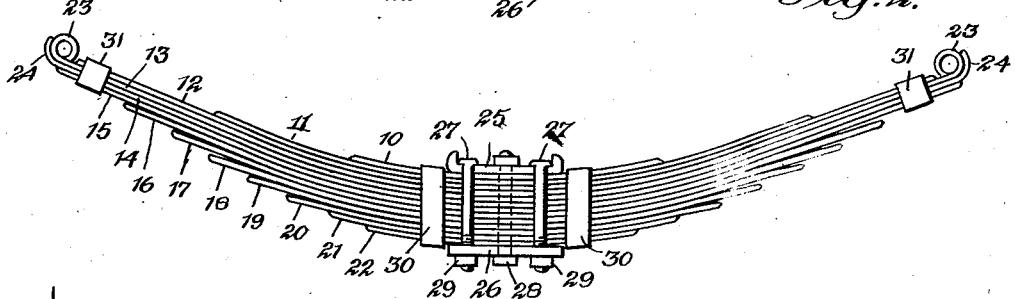
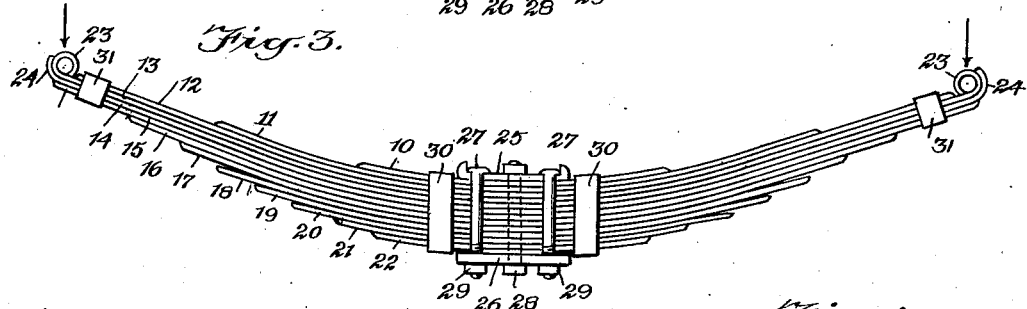
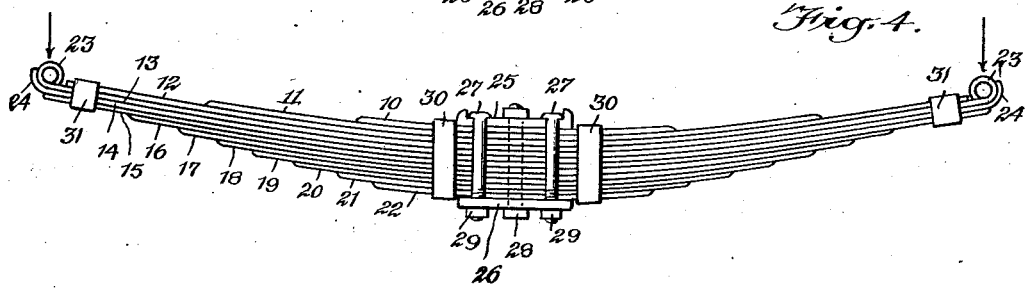
WITNESSES
INVENTOR
Martin Schilde
BY
ATTORNEYS Patented May 28, 1940

2,202,603

UNITED STATES PATENT OFFICE 2,202,603

VEHICLE SPRING

Martin Schilde, New Orleans, La.

Application April 6, 1939, Serial No. 266,291

3 Claims. (Cl. 267—48)

This invention relates to suspension springs of the bowed or semi-elliptical type designed and adapted for use on automobiles and analagous vehicles.

An object of the invention is the provision of a spring of the indicated character which embodies leaves of such form, length and resilience, and so assembled relatively to each other as to give a soft and effectual cushioning action regardless of the load imposed within capacity limit, and which stabilizes, retards or checks all recoil and rebound, and especialy that resulting from abnormal shocks, stresses and strains to which the spring is subjected incidental to a vehicle traveling over rough, bumpy or uneven road surfaces.

Other objects and advantages of the spring of the present invention are: An automobile or similar vehicle equipped with this improved spring suspension will ride with the same degree of increased and uniform resiliency when one person is riding as when loaded to full capacity. In accordance therewith the spring consists of upper stabilizing leaves and lower load sustaining leaves in cooperative relation, the stabilizing leaves serving to check the reduced rebound and act as a shock absorber, while the load sustaining leaves carry the load, reduce the rebound and produce the increased and uniform resiliency. This assures a smooth and softly cushioned ride whether the auto or vehicle is empty or loaded to full capacity.

The spring reduces vibration thereby prolonging the life of a vehicle, and consequently costs for making repairs and replacement of worn and broken parts will be materially reduced.

The spring is simple of construction, strong and safe. It may be used at the front end as well as the rear end of a car or vehicle without employing other resiliency producing and shock absorbing devices. The usual chassis frames may be equipped with springs embodying the invention without any alterations.

The nature of the invention and its features and advantages will appear when the following specification is read in connection with the accompanying drawing in which—

Fig. 1 is a side view of a spring embodying features of the invention and showing the upper stabilizing and lower load sustaining leaves disassembled;

Fig. 2 is a side view of the spring showing the leaves thereof assembled and in a normal condition in which the stabilizing leaves are held under tension;

Fig. 3 is a view similar to Fig. 2, but showing the condition of the spring when sustaining part of a capacity load; and Fig. 4 is a view similar to Fig. 2, but showing the condition of the spring when sustaining a full capacity load.

Referring now more particularly to Fig. 1, it will be seen that, generally stated, the spring consists of two groups of spring leaves, there being an upper or stabilizing group and a lower or load sustaining group. The stabilizing group consists of leaves 10, 11 and 12, respectively, which are of different length but of the same curvature. In other words these leaves 10, 11 and 12 are each bowed downwardly at the ends, the leaf 10 being the shortest, the leaf 11 being of intermediate length and the leaf 12 being the longest. The load sustaining group consists of main leaves 13 and 14, a supporting leaf 15, and supplemental leaves 16, 17, 18, 19, 20, 21 and 22, respectively. Leaves 13, 14 and 15 are the longest and are substantially the same length and have the same curvature. The leaves 13, 14 and 15 are bowed upwardly from the middle to their ends. The ends of the leaf 13 are curled to form eyes 23, the ends of the leaf 14 are curled to provide hooks 24 which engage the eyes 23 respectively, and the ends of the leaf 15 are substantially straight. The supplemental leaves 16 to 22 inclusive are of different length and different curvature. Each is bowed upwardly from the middle to its ends. The uppermost of these leaves is the longest and the lowermost is the shortest with graduated length leaves between long leaf 15 and the short leaf 22.

All of the leaves are flat and of the same width throughout but may be slightly tapered.

Use is made of a shouldered top plate 25, a bottom plate 26, two U bolts 27 and a center bolt 28 to rigidly secure all of the leaves together at the middle. The plates 25 and 26 embrace or contact the leaves 10 and 22 respectively, and the bolts 27 extend over the plate 25 in contact therewith, the lower ends thereof extending through the plate 26, and the nuts 29 threaded on said ends being in contact with the plate 26. The bolt 28 extends through all of the leaves and the two plates, all of which are provided with holes for that purpose. The nuts of this bolt contact the plates 25 and 26 respectively.

Clips 30 embrace all of the leaves and are disposed closely adjacent the plates 25 and 26. Clips 31 embrace the adjacent ends of the leaves 12, 13, 14 and 15. The clips 30 and 31 prevent the leaves from shifting sidewise, but permit endwise movement of the ends of the leaves 12, 13, 14 and 15 with respect to each other. The eyes 23 accommodate the bolts of the usual shackles or hangers connected with the chassis frame in order to suspend the spring.

By the securement of the stablizing leaves 10, 11 and 12 in assemblage with the leaves 13 to 22 inclusive with the middle securing means 25 to 30 inclusive, the leaves 10, 11 and 12 are flexed and constantly held under tension while the leaves 13 to 22 remain unflexed. The leaf 12 lies in contact with the leaf 13 throughout. The leaves 10, 11 and 12 constantly exert a downward pressure against the lower or load sustaining leaves 13, 14 and 15 producing a soft cushioning effect and reduced recoil or rebound, and check or retard the recoil or rebound when the spring is in use. The leaves 10, 11 and 12 never carry any of the load.

In the assemblage, the leaves 13, 14 and 15 sustain the weight of the vehicle chassis frame, power plant, and empty body independent of the supplemental leaves 16 to 22 inclusive. The leaves 13, 14 and 15 are in contact with each other throughout the length thereof.

The supplemental leaves 16 to 22 are of different curvature and as secured in the assemblage the ends are separated a certain distance apart from each other, except leaves 21 and 22 which are always in contact with each other, as shown in Fig. 2. The supplemental leaves 16 to 20 inclusive at their ends engage in seriatim the adjacent ends of the leaf 15 and each other as the load imposed increases from empty to full capacity. In this manner only a sufficient number of leaves will make contact with each other in proportion to the load, so as to keep or cause the contacting leaves in action. In Fig. 3 is illustrated the condition of the spring when a load between empty and full capacity is sustained. In Fig. 4 is illustrated the condition of the spring when a full capacity load is sustained.

The leaves 21 and 22 take care of possible overload or sharp jolts due to bad road conditions.

From the foregoing it will be obvious that the stabilizing leaves 10, 11 and 12 do not sustain any part of the weight or load; that by reason of the fact that leaves 10, 11 and 12 constantly exert a downward pressure they produce a soft cushioning effect and check the reduced recoil or rebound whether the load is sustained by the main leaves 13, 14 and 15 or by these leaves together with the leaves 16 to 22 inclusive or any number of the latter; that the leaves 10, 11 and 12 check recoil or rebound resulting when the spring is subjected to abnormal upwardly imposed shocks or strain caused by the vehicle traction wheels encountering rough, bumpy or uneven road surfaces and obstacles; and that increased and uniform resiliency and stability are attained together with little or no vibration. My spring produces a stabilized chassis; no front bobbing or dipping; level starts, level stops, level rides.

It is to be understood that any suitable number of leaves to constitute the stabilizing group may be employed in proportion to the load to suit conditions; and that the parts of the spring between the clips 30 and 31 will be covered with a suitable metal cover to exclude all dirt and grit.

I claim:

1. A vehicle spring of the bowed type consisting of stabilizing leaves, main load sustaining leaves and supplemental load sustaining leaves, and means securing all of said leaves together at the middle, said supplemental leaves being of different length and different curvature and thus having their end portions normally separated from each other, said end portions engaging each other in seriatim as the load imposed increases, said stabilizing leaves being held flexed by said means to put them constantly under tension to resiliently resist the upward flexure of the load sustaining leaves.

2. A vehicle spring consisting of upper and lower groups of flat bowed leaves, and means rigidly securing said leaves together at the middle, said upper group of leaves being of such form and resiliency as to be held under tension by said means to constantly exert downward pressure against the lower group of leaves, thereby to produce a cushioning effect under load strain and stress and to retard and check recoil or rebound when the spring is subjected to ordinary and abnormal upwardly imposed shocks or strain, said lower group of leaves including leaves which come into play successively to aid in sustaining the load as it increases.

3. A vehicle spring consisting of upper and lower groups of flat bowed leaves, means rigidly securing all of said leaves together at the middle, the leaves of the upper group being of different length, clips engaging the ends of the lower leaf of the upper group with the adjacent ends of the leaves of the lower group, said clips preventing sidewise movement of the leaves with respect to each other and permitting endwise movement of the ends of the leaves under flexure, said upper group of leaves being constantly held under tension by said means to constantly exert downward pressure against the lower group of leaves, thereby to produce a cushioning effect under load strain and stress and to retard and check recoil or rebound when the spring is subjected to ordinary and abnormal upwardly imposed shock and strain, said lower group of leaves including leaves which come into play successively to aid in sustaining the load as it increases.

MARTIN SCHILDE.